UNITED STATES PATENT OFFICE.

GEORGE DURYEE, OF ORANGE, NEW JERSEY.

PROCESS OF MANUFACTURING CEMENT.

SPECIFICATION forming part of Letters Patent No. 417,634, dated December 17, 1889.

Application filed March 30, 1889. Serial No. 305,407. (No specimens.)

*To all whom it may concern:*

Be it known that I, GEORGE DURYEE, a citizen of the United States, residing at Orange, in the county of Essex and State of New Jersey, have invented certain new and useful Improvements in the Process of Manufacturing Cement, of which the following is a clear and exact specification.

My invention relates to improvements in the art of manufacturing that grade of cement known as "Portland cement;" and it consists in features of novelty hereinafter fully explained, and specifically pointed out in the claims hereto annexed.

Portland cement, as is well known, consists of a double silicate of lime and alumina in about the following proportions: lime, from fifty-seven to sixty-five parts; silica, from twenty-three to twenty-five parts; alumina, from five to eight parts; and it is generally produced by the mechanical and chemical combination of the lime derived from carbonate of lime and silica and alumina derived from clay. The mechanical combination is brought about in two ways. In the "wet process" the raw materials are dissolved and combined in water and then dried and broken into cakes or formed into bricks and dried. In the "dry process" they are reduced to powder and thoroughly intermixed, then wet and formed into blocks or bricks. The chemical combination in either case is then brought about by subjecting the mixture to a high heat in suitable kilns. In former processes it has taken from three to six days to effect a perfect chemical union of the constituent parts. My aim has been to produce this chemical union in a much shorter time and with less labor and expense than by the methods heretofore practiced.

In carrying out my process I prefer to use one of the furnaces shown and described in my Letters Patent, Nos. 236,561 and 236,562, granted January 11, 1881; but of course I do not confine myself to any particular form of apparatus.

I have found that when the materials are combined in the usual method they may be burned to vitrifaction with sufficient heat in the short time of their passage through either of my furnaces, as described in the above-mentioned patents; but the chemical combination is not always perfect, although favorable results were sometimes attained. I have found that the silica was not at all times sufficiently fused to effect the desired combination. I have, however, discovered that by the addition to the mixture of a suitable fluxing material this combination speedily takes place and results in a perfect product. Various alkaline fluxes—such as caustic soda—will expedite the chemical union when the material is subjected to a sufficient degree of heat; but they are liable to impair the product if too large a portion is used. I have found that fluor-spar produces the best results and may be used in considerable quantities—say as high as one part of fluor-spar to ten of mixed lime, silica, and alumina—without impairing the product, and that one part of fluor-spar to twenty parts of the mixture will produce a speedy fusion and improve the cement product. In using the fluor-spar allowance should be made, however, for the carbonate of lime it contains, which is generally about fifty per cent.—that is, the proportion of lime in the raw materials first mentioned should be diminished to allow for the addition of lime from the fluor-spar. Therefore my process of manufacturing Portland cement consists in combining fluor-spar as a flux with natural product containing proper proportions of lime, silica, and alumina, and subjecting this mixture to a proper degree of heat in any apparatus, like my "blow-pipe revolving furnace" or my "metallurgic furnace," described in my above-named patents.

The proper proportions of lime, silica, and alumina are as hereinbefore given. The necessary degree of heat to produce speedy fusion and chemical combination would vary somewhat with the character of the material and the amount of flux, but may be stated as about "white heat." As the degree of heat in my furnaces may be easily regulated and maintained continuously at a fixed point, it is only necessary to ascertain by tests the degree requisite for the materials to be used. In actual practice I have used one hundred parts of limestone containing fifty-two per cent. of lime, and twenty-one parts of clay containing fifty-four per cent. silica and twenty-one per cent. alumina, and six parts of fluor-spar containing about fifty per cent. lime and fifty per cent. fluorine. These were ground to fine powder and thoroughly mixed, then fed into a furnace similar to my metallurgic furnace, as described in the patent before referred to, using crude petrolum with hot-air blast for fuel. About one and three-quarters of an hour was consumed in passing the material through the furnace, it being subjected to a white heat for about twenty minutes at the discharging end of the furnace. The product was semi-fused in the form of balls, and when ground produced a high grade of Portland cement suitable for immediate use, standing six hundred and thirty-four pounds tensile strength per square inch one day in air, twenty days in water. These proportions may be varied, and the wet method may be used for mixing the materials; but I have thus fully described the process that any person skilled in the art may understand and be able to adapt the process to the materials he has on hand.

The wet mixture of clay, alumina, and lime may be fed into the revolving cylinder described direct from a pug-mill or mixing-tank without the expensive drying process.

Having thus described my invention, the following is what I claim as new therein and desire to secure by Letters Patent:

1. The process of manufacturing cement, which consists in mixing fluor-spar with clay and lime and subjecting the mixture to the action of heat, substantially as set forth.

2. The process of manufacturing cement, which consists in mixing fluor-spar with cement-producing material and subjecting the mixture to the action of heat while in a dry and comminuted state, substantially as set forth.

3. The process of manufacturing cement, which consists in comminuting and intimately mixing lime, alumina, silica, and fluor-spar, and agitating the mixture in the presence of heat while in a dry and comminuted state, substantially as set forth.

4. The process of manufacturing cement, which consists in comminuting the cement-producing materials, intimately mixing the same with a fluxing medium, and agitating the mixture in the presence of heat while in a dry and comminuted state, substantially as set forth.

GEORGE DURYEE.

Witnesses:
GUSTAV KEHR,
LOUIS PFINGSTAG.